United States Patent [19]

Yoshida et al.

[11] Patent Number: 4,714,451
[45] Date of Patent: Dec. 22, 1987

[54] V BELT STEPLESS VARIABLE TRANSMISSION

[75] Inventors: Ryo Yoshida; Hiroshi Aikawa, both of Ikeda, Japan

[73] Assignee: Daihatsu Motor Company Limited, Osaka, Japan

[21] Appl. No.: 748,401

[22] Filed: Jun. 24, 1985

[30] Foreign Application Priority Data

Jun. 23, 1984 [JP] Japan .................. 59-129478

[51] Int. Cl.⁴ .............................................. F16H 9/04
[52] U.S. Cl. ........................................ 474/28; 474/29
[58] Field of Search ..................... 474/28, 29, 10, 19, 474/109

[56] References Cited

U.S. PATENT DOCUMENTS

| | | | |
|---|---|---|---|
| 3,365,967 | 1/1968 | Moogk | 474/19 |
| 3,722,308 | 3/1973 | Steuer | 474/19 |
| 4,016,771 | 4/1977 | Berens et al. | 474/19 |
| 4,026,161 | 5/1977 | Vogel | 474/19 |
| 4,048,864 | 9/1977 | Ritter | 474/28 |
| 4,173,155 | 11/1979 | Togami et al. | 474/19 |
| 4,321,991 | 3/1982 | Teijido et al. | 474/19 |
| 4,523,917 | 6/1985 | Schildt | 474/19 |

FOREIGN PATENT DOCUMENTS

| | | |
|---|---|---|
| 0073546 | 3/1983 | European Pat. Off. . |
| 2232933 | 1/1975 | France . |
| 58-142060 | 8/1983 | Japan . |
| 299013 | 8/1954 | Switzerland . |
| 940870 | 11/1963 | United Kingdom . |
| 1475394 | 6/1977 | United Kingdom . |
| 2033984 | 5/1980 | United Kingdom . |
| 2080892 | 2/1982 | United Kingdom . |

Primary Examiner—Stephen J. Novosad
Assistant Examiner—Bruce M. Kisliuk
Attorney, Agent, or Firm—Stevens, Davis, Miller & Mosher

[57] ABSTRACT

A V belt stepless variable transmission provided with a driving pulley comprising a stationary conical disc fixed to a drive shaft and a movable conical disc axially movable with respect to the drive shaft, a driven pulley comprising a stationary conical disc fixed to a driven shaft and a movable conical disc axially movable with repsect to the driven shaft, and an endless V belt running across both the pulleys, so that an interval between each stationary conical disc and each movable conical disc is changed to thereby carry out stepless variable transmission, the driving pulley being provided with a tension adjusting means for mechanically giving to the movable conical disc thrust to meet input torque to thereby adjust tension on the V belt, and the driven pulley being provided with an hydraulic actuating cylinder for hydraulically driving the movable conical disc at the driven pulley, so that a fluid is supplied or discharged to or from the hydraulic actuating cylinder so as to actuate the movable conical disc at the driven pulley, thereby controlling the pulley ratio.

6 Claims, 4 Drawing Figures

V BELT STEPLESS VARIABLE TRANSMISSION

FIELD OF THE INVENTION

This invention relates to a V belt stepless variable transmission used mainly for an automobile, and more particularly to a V belt stepless variable transmission provided with a driving pulley and a driven pulley each provided with a stationary conical disc and an axially movable conical disc, and an endless belt running across the driving and driven pulleys, each movable conical disc being axially moved with respect to each stationary conical disc to change an interval therebetween, thereby carrying out the stepless speed change.

BACKGROUND OF THE INVENTION

The conventional V belt stepless variable transmission constructed as foregoing has hitheto been well-known, which, as disclosed in the Japanese Patent Laid-Open Gazette No. Sho 58-42,862, hydraulically controls the movable conical disc at the driving pulley cooresponding to the number or rotations of an engine and the degree of opening of a throttle, and the movable conical disc at the driven pulley for applying a predetermined tension to the V belt.

In this case, since the tension applied to the V belt is controlled corresponding to a pulley ratio and the number of rotations of the engine, the V belt is not subjected to tension to meet input torque, thereby creating the defect of reducing a life span of the V belt and deteriorating the transmission efficiency. For eliminating such defect, it is proposed that the movable conical disc is urged by an urging force corresponding to the input torque so that belt tension to meet it is generated. Such method has to convert the detected input torque into hydraulic pressure and then the hydraulic pressure into the urging force to be applied to the movable conical disc, thereby creating the problem in that such multi-stage conversion process complicates the transmission and variation in oil temperature causes errors that are too large.

Another stepless variable transmission has been disclosed in the Japanese Patent Laid-Open Gazette No. Sho 58-142,060, which is provided at the driving pulley with a weight roller using a centrifugal force for axially urging the movable conical disc at the same, at the driven pulley with a torque cam for axially urging the movable conical disc at the driven pulley corresponding to the transmission torque, and at both the driving and driven pulleys with mechanical control mechanisms, thereby designing the transmission simple in construction.

In this case, since the torque cam can obtain the linear urging force from the transmission torque to the movable conical disc, it is advantageous that proper tension to meet the transmission torque can be applied to the V belt, but the driving pulley, which employs a centrifugal weight roller, is controllable only of the pulley ratio corresponding to the number of rotations of the engine. Hence, the latter method is inferior to the former method in accuracy of the hydraulic control. Also, since the movable conical disc is urged by a force proportional to the square of the number of rotations of the engine, the V belt is more loaded than it needs, resulting in the defect not only of reducing the life span of the V belt but also of causing a larger power loss.

SUMMARY OF THE INVENTION

An object of the invention is to provide a V belt stepless variable transmission which is simple in construction, applicable to the V belt of proper tension to meet input torque, controllable of a pulley ratio with accuracy corresponding to the running condition of the automobile, and adjustable of the pulley ratio quickly and with proper responsibility.

In order to attain the above object, this invention has been designed.

Thb inventors have paid attention in that mechanical means, such as a torque cam, is the simplest and the most accurate way to apply to the V belt the tension to meet the input torque, and hydraulic means is the most accurate to obtain a proper pulley ratio because of the necessity of control corresponding to the number of rotations of an engine and the degree of opening of a throttle. The present invention is characterized in that a driving pulley is provided with tension adjusting means which mechanically applies to a movable conical disc at the driving pulley thrust to meet input torque to thereby adjust the tension of the V belt, a driven pulley is provided with a hydraulic actuating cylinder which functions to axially shift a movable conical disc at the driven pulley, and a pulley ratio control means is provided which supplies and discharges fluid to and from the hydraulic actuating cylinder to thereby actuate the movable conical disc at the driven pulley and control the pulley ratio corresponding to the running condition of an automobile.

This invention, which provides the aforesaid tension adjusting means, can apply to the V belt the thrust to meet the input torque, thereby reducing the slip and wearing in the V belt. Moreover, since the tension adjusting means is provided not at the driven pulley but at the driving pulley, the tension corresponding to the input torque can be applied to the V belt properly with simple construction. Also, since the aforesaid hydraulic actuating cylinder is provided at the movable conical disc at the driven pulley so that the fluid is supplied and discharged to and from the cylinder to actuate the movable conical disc at the driven pulley to thereby control the pulley ratio, the pulley ratio is controllable with accuracy on the basis of the factors of, for example, the number of rotations of the engine and the degree of opening of the throttle.

Generally, it is necessary for the automobile, when halted from its running condition, to quickly change the pulley ratio from a high pulley ratio (the driving pulley of larger diameter and the driven one of smaller diameter) to a low pulley ratio (the driving pulley of smaller diameter and the driven one of larger diameter) so as to prepare for the next start.

In a case where the driving pulley controls the aforesaid pulley ratio, since the same has to be smaller in diameter, when the movable conical disc is rapidly actuated, the thrust is lost to cause a slip at the V belt, thereby making impossible quick operation. The present invention, however, carries out the control of the pulley ratio at the driven pulley, in which the thrust acting on the V belt is not lost because the driven pulley is made larger in diameter so as not to lose the thrust. Hence, the quick operation is possible to that extent to enable the pulley ratio to be controlled with quick and good responsibility.

Also, in this invention, the movable conical disc at the driven pulley, which is hydraulically driven to control the pulley ratio, is axially movable by a force smaller than that used for hydraulically driving the movable conical disc at the driving pulley to control the pulley ratio. In other words, upon observing tension distribution on the belt during the power transmission, it is smaller at the driven pulley side than at the driving pulley side, whereby the movable conical disc at the driven pulley can be axially shifted by a force smaller than that for the movable conical disc at the driving pulley.

Hence, it is possible to set low pressure of the fluid supplied to the hydraulical actuating cylinder, thereby reducing a power loss of an oil pump to that extent.

The above and further objects and novel features of the invention will more fully appear from the following description when the same is read in connection with the accompanying drawings.

DETAILED DESCRIPTION OF THE INVENTION

Figure 1:
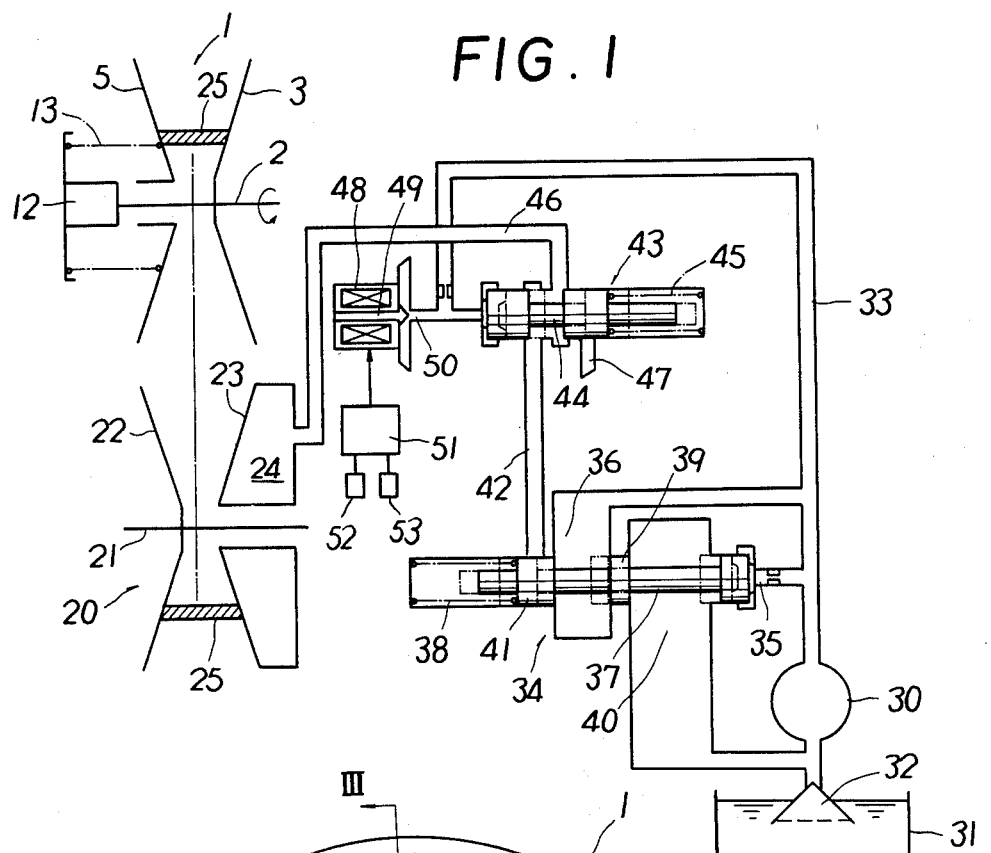
FIG. 1 is a schematic structural view of an embodiment of a V belt stepless variable transmission as a whole of the invention.

Referring to FIG. 1, an embodiment of a V belt stepless variable transmission of the invention is shown, which is provided with a driving pulley 1, a driven pulley 20, and an endless belt 25 stretched across both the pulleys 1 and 20.

The driving pulley 1 comprises a stationary conical disc 3 fixed to a drive shaft 2 and a movable conical disc 5 axially movable with respect to a drive shaft 2, both the discs 3 and 5 being adapted to change the diameter of pulley 1, the movable conical disc 5 being provided at the rear with a torque cam 12 and a torsion spring 13 which are exemplary of mechanical tension adjusting means.

Figure 2:
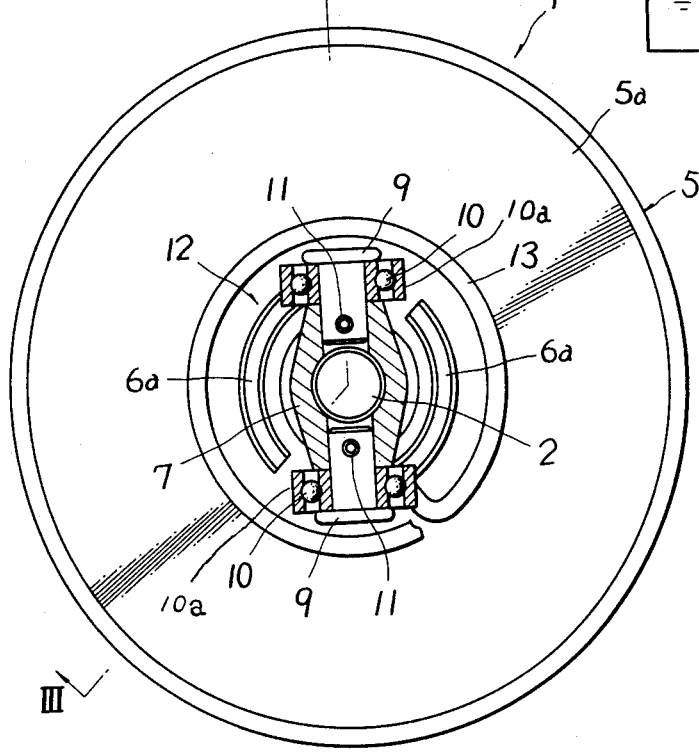
FIG. 2 is a left-hand side view in detail of a driving pulley.
Figure 3:
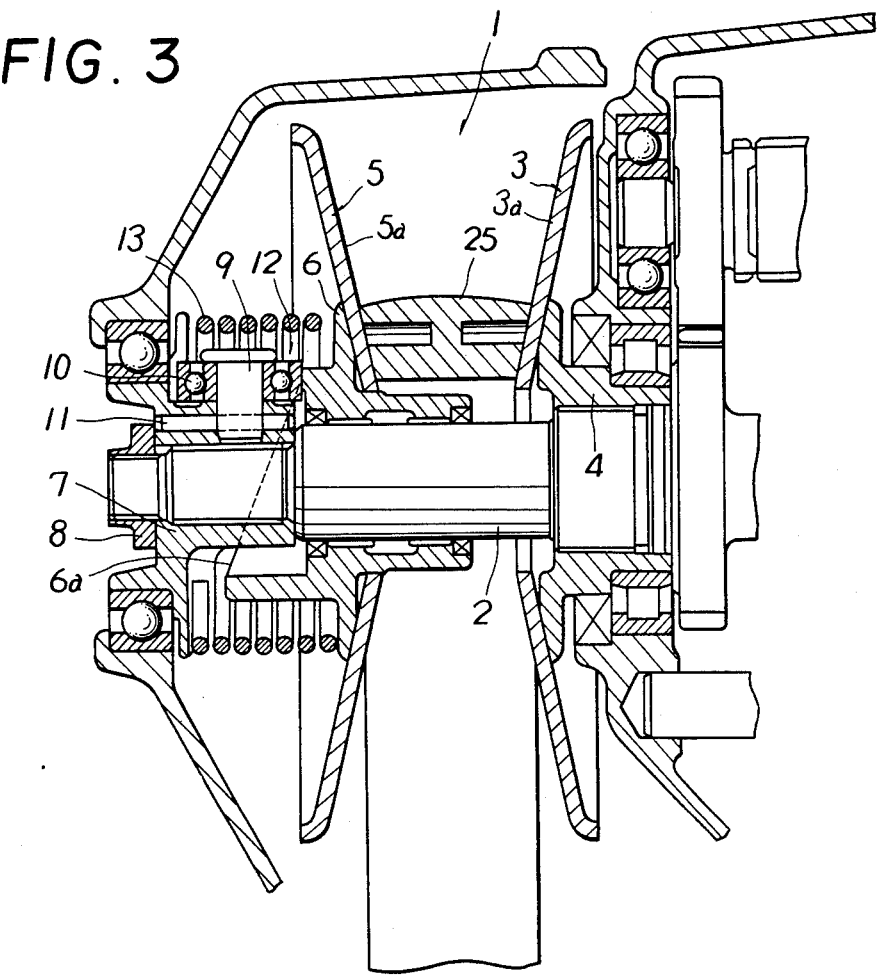
FIG. 3 is a sectional view taken on the line III—III in FIG. 2.

Here, construction of the driving pulley 1 will be detailed in accordance with FIGS. 2 and 3. The stationary conical disc 3 comprises a dish-like-shaped body 3a and a boss 4 fixed at the outer periphery of the drive shaft 2, and is fixed integrally thereto through the boss 4.

The movable conical disc 5 comprises a dish-like-shaped body 5a the same in shape as the disc body 3a and a cam 6 axially slidable and rotatable with respect to the drive shaft 2, the cam 6 constituting tension adjusting means and having at the left side end face two cam faces 6a of semicircular arc and symmetrical with respect to the axis of drive shaft 2, the cam faces 6a each gradually inclining counterclockwise and toward the utmost end of drive shaft 2 in FIG. 2 (this side thereof). An end member 7 is connected to the axial end of drive shaft 2 through a lock nut 8 and carries on the outer periphery through pins 9 two bearings 10 positioned symmetrically with respect to the drive shaft 2 and having cylindrical contacts 10a rollably-contacting with the cam faces 6a respectively, the pins 9 being locked with respect to the end member 7 through press-fit pins 11 respectively.

Each bearing 10 rotates together with the drive shaft 2 through the end member 7 to thereby apply the thrust to the cam 6, in turn the movable conical disc 5, and constitutes together with the cam faces 6 a torque cam 12.

Also, between the end member 7 and the cam 6 is interposed the torsion spring 13 which urges the movable conical disc 5 at a fixed pressure always toward the stationary conical disc 3, the torsion spring 13 being provided for allowing the movable conical disc 5 to keep a fixed contact pressure onto the V belt 25 even when the driving pulley 1 stops.

The movable conical disc 5 as above-mentioned is subjected to the sum of the urging forces by the torque cam 12 and torsion spring 13 as the thrust for the conical disc 5. This thrust allows the movable conical disc 5 to bear a half of the torque transmitted to the V belt 25. Now, when the input torque of drive shaft 2 increases, the previous thrust makes the belt tension insufficient so that there is the danger of causing slippage between the driving pulley 1 and the V belt 25. At this time, however, the movable conical disc 5 is delayed with respect to the stationary conical disc 3 (rotates reversely to the driving direction relative to the stationary conical disc 3), whereby the delay allows the bearings 10 to ride on the cam faces 6a. The cam faces 6a, the movable conical disc 5, are urged toward the stationary conical disc 3. In other words, the torque cam 12 is adapted to automatically adjust the thrust for the disc in order to apply the proper belt tension to meet the input torque.

Alternatively, the torque cam may, other than the combination of the cam face 6a and bearing 10, comprise an inclined cam groove provided at a cylindrical cam, and a roller pin slidable in the cam groove.

Also, the driven pulley 20, the same as the driving pulley 1, has a stationary conical disc 22 fixed to a driven shaft 21 and a movable conical disc 23 axially movable with respect to the driven shaft 21, the movable conical disc 23 having at the rear thereof a hydraulic actuate cylinder 24 as shown in FIG. 1.

The movable conical disc 23 is actuated by supplying and discharging fluid to and from the hydraulic actuating cylinder 24 to thereby control the pulley ratio, such supply and discharge of the fluid are controlled by pulley ratio control means.

The pulley ratio control means, as shown in FIG. 1, is provided with an oil pump 30, a regulator valve 34, a pulley ratio control valve 43 and a solenoid valve 48. Oil is pumped up by the oil pump 30 from an oil tank 31 through a filter 32 and passes through an oil passage 33 to act on a port 35 at the right-hand end of regulator valve 34 and a port 36 at an intermediate portion of the same so that oil pressure shifts a spool 37 at the regulator valve 34 leftwardly against a spring 38. Upon arrival of a land 39 of the spool 37 at the position shown by the one dot chain line in the drawing, the ports 36 and 40 communicate with each other and the oil is returned to the suction side of oil pump 30. In other words, the spool 37 is balanced at this position to keep always constant (line pressure) the oil pressure in the oil passage 33. In addition, at the position where the regulator valve 34 is balanced, since a land 41 at the left end of the spool 37 has moved leftwardly, an oil passage 42 is subjected to line pressure of the oil passage 33.

A spool 44 at the pulley ratio control valve 43 is pushed leftwardly by a spring 45 and a needle valve 49, when the solenoid valve 48 is off, opens an opening 50 to drain the oil pressure from the oil passage 33, whereby the spool 44 is positioned at the left end of control valve 43. Hence, the oil passages 42 and 46 communicate with each other so that the line pressure acts on the hydraulic actuating cylinder 24 at the driven pulley 20 to enlarge the diameter thereof. While, upon turning on the solenoid valve 48, the needle valve 49 closes the opening 50 so that the spool 44 is subjected to line pressure of the oil passage 33 so as to move rightwardly (shown by the one dot chain line in FIG. 1) overcoming the spring 45. Accordingly, the oil passage 42 is shut off so that the oil pressure in the hydraulic actuating cylinder 24 is drained from a drain port 47 through the oil passage 46, resulting in that the oil pressure in the cylinder 24 lowers to diminish a diameter of the driven pulley 20.

Figure 4:
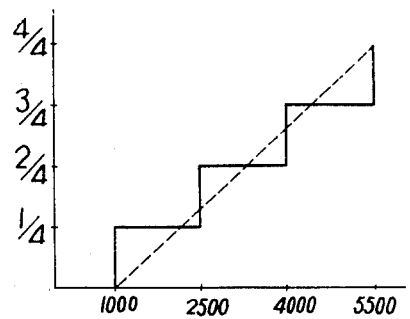
FIG. 4 is an illustration of ideal operating condition stored in an electronic controller.

The solenoid valve 48 is on-off-controlled by an electronic controller 51. The electronic controller 51 previously stores an ideal running condition of the automobile superior in power performance and fuel expense as shown in FIG. 4. For example, the number of rotations of the engine is set to be 5500 rpm when the degree of opening of the throttle is kept in 3/4 to 4/4. On the other hand, the actual running condition is detected by running condition detecting means mainly comprising an engine speed sensor 52 and a throttle opening degree sensor 53, and the detection signal from the detecting means is given to the electronic controller 51, so that the actual number of rotations of the engine and actual degree of opening of the throttle are compared by the electronic controller 51 with the preset value. For example, when the actual number of rotations of the engine is larger than that in the ideal running condition, the solenoid valve 48 is on, and when the same is smaller than the ideal number of rotations of the engine, the solenoid valve 48 is off. Incidentally, the ideal running condition controlled by the electronic controller 51 may, other than stepwise variation in the running condition, be a continuous running curve as shown by the broken line in FIG. 4.

Now, when the actual number of engine rotations is larger than the ideal number of the same corresponding to the degree of opening of the throttle, the solenoid valve 48 is on to drain the oil pressure in the hydraulic actuating cylinder 24, thereby diminishing the pulley diameter of driven pulley 20 and enlarging that of driving pulley 1. In brief, the pulley ratio is made smaller, whereby a larger load is applied to the driving side (the engine side) to decrease the number of rotations of the engine, which becomes smaller than the ideal number of engine rotations in FIG. 4, at which time the electronic controller 51 having detected the number of engine rotations turns the solenoid valve 48 off, so that oil pressure is introduced into the hydraulic actuating cylinder 24, thereby enlarging the diameter of driven pulley 20 and diminishing that of driving pulley 1. In brief, the pulley ratio becomes larger to decrease the load on the engine so that the number of rotations of the engine becomes larger than the ideal number, and then such operation will be repeated sequentially. Thus, one solenoid valve 48 is turned on-off only to thereby enable the stepless transmission to be controlled under the ideal pulley ratio.

In addition, other than the above-mentioned control of the pulley ratio, the pulley ratio may alternatively be controlled by hydraulic signals from a Pitot's tube provided to detect the number of rotations of the drive shaft and from a cam member in association with the degree of opening of the throttle.

Also, in the above embodiment, the hydraulic actuating cylinder 24 is provided at the rear of the movable conical disc 23 which serves also as the hydraulic piston. Alternatively, the movable conical disc 23 may be urged at the rear thereof by, for example, a separate actuator piston communicating with a pulley ratio control valve.

While a preferred embodiment of the invention has been described using specific terms, such description is for illustrative purpose only, and it is understood that changes and variations may be made without departing from the spirit or scope of the following claims.

What is claimed is:

1. A V belt stepless variable transmission comprising: a driving pulley connected with a drive shaft, a stationary conical disc fixed thereto, and a movable conical disc movable with respect to said drive shaft; a driven pulley connected with a driven shaft, a stationary conical disc fixed thereto, and a movable conical disc axially movable with respect to said driven shaft; and an endless V belt running across both said pulleys, said driving pulleys being provided with a tension adjusting means disposed between said driving shaft and said movable conical disc at said driving pulley so as to mechanically apply to said movable conical disc thrust corresponding to input torque to thereby adjust tension on said V belt, said tension adjusting means having a cam with a cam face and axially slidable with respect to said drive shaft and rotatable, and a contact member contactable with said cam face so as to rotate integrally with said drive shaft to thereby give thrust to said cam, said cam being fixed to said movable conical disc at said driving pulley, said driven pulley having a hydraulic actuating cylinder for axially shifting said movable conical disc at said driven pulley, and said variable transmission being provided with a pulley ratio control means for supplying and discharging fluid to and from said hydraulic actuating cylinder so as to actuate said movable conical disc at said driven pulley, thereby controlling the pulley ratio.

2. A V belt stepless variable transmission according to claim 1, wherein said drive shaft is provided with an end member opposite to said movable conical disc, said end member rotatably supporting a cylindrical contact member contactable with said cam face.

3. A V belt stepless variable transmission according to claim 1, wherein said tension adjusting means is provided with a torsion spring for biasing said movable conical disc at said driving pulley toward said stationary conical disc thereat.

4. A V belt stepless variable transmission according to claim 1, wherein said stationary conical disc and movable conical disc at said driving pulley are provided with disc bodies of the same dish-like shapes respectively, said stationary conical disc comprising said disc body and a boss fixed to said drive shaft, said movable conical disc comprising said disc body and a cam supported slidably and rotatably to said drive shaft and constituting said tension adjusting means.

5. A V belt stepless variable transmission according to claim 1, wherein said pulley ratio control means is provided with an oil pump, a regulator valve, a pulley ratio control valve, a solenoid valve, a running condition detecting means and an electronic controller for comparing a preset value of the running condition with a measured value thereof by said detecting means to thereby on-off-control said solenoid valve.

6. The transmission of claim 1 in operative combination in an automobile.

* * * * *